United States Patent [19]

Swearingen et al.

[11] 4,273,390

[45] Jun. 16, 1981

[54] BEARING SYSTEM WITH THRUST COMPENSATION MEANS

[75] Inventors: Judson S. Swearingen; Michael D. Irvine, both of Los Angeles, Calif.

[73] Assignee: Rotoflow Corporation, Los Angeles, Calif.

[21] Appl. No.: 905,649

[22] Filed: May 15, 1978

[51] Int. Cl.³ .............................................. F16C 1/24
[52] U.S. Cl. .................................. 308/168; 308/121
[58] Field of Search .............................. 308/168–172, 308/121–122, 9; 73/140; 415/104

[56] References Cited

U.S. PATENT DOCUMENTS

| | | | |
|---|---|---|---|
| 3,146,037 | 8/1964 | Hooker | 308/9 |
| 3,442,560 | 5/1969 | DeGast | 308/122 X |
| 3,895,689 | 7/1975 | Swearingen | 415/104 X |

*Primary Examiner*—Douglas C. Butler
*Attorney, Agent, or Firm*—Browning, Bushman & Zamecki

[57] ABSTRACT

The present invention pertains to a thrust bearing system including a thrust bearing structure having at least one pair of opposed bearing faces defining a bearing space therebetween, and a sub-system for delivering lubricant to the bearing space. A load sensor is provided in association with the bearing structure for determining the loads on the bearing faces. A thrust compensation sub-system is operably associated with the load sensor. This thrust compensation sub-system is operative, upon sensing by the load sensor of a thrust load on the bearing faces in excess of a predetermined limit, to increase the pressure of lubricant being delivered to the bearing space.

10 Claims, 3 Drawing Figures fig.1 fig.2 fig.3

BEARING SYSTEM WITH THRUST COMPENSATION MEANS

BACKGROUND OF THE INVENTION

1. Field of the Invention

The present invention pertains in general to the field of thrust bearings. Such bearings are frequently incorporated into the overall bearing structure for rotary equipment such as a rotating shaft. Such a shaft typically carries a rotary device at at least one end thereof, and depending upon the nature of this device, the axial or thrust loading on the shaft may be quite high. It is conventional to introduce a suitable lubricant such as oil under pressure into the bearing space defined by the opposed relatively rotating faces of the thrust bearing. The pressurization of the lubricant significantly increases the load carrying capacity of the thrust bearing by virtue of what is sometimes referred to as a "hydrostatic" effect. However, in many types of rotary devices there are relatively large variations in the magnitude of the thrust load during operation. For example, where the rotary equipment carried by a rotating shaft includes one or more fluid handling rotors, such as the rotors of turbo-expanders, compressors, or the like, there may be transient surges or increases in the thrust loading, and such increases may be both large and sudden. Because dimensional and speed limitations prevent the use of thrust bearings large enough to carry the greatest anticipated emergency loads resulting from such fluctuations, it is necessary to provide some means for preventing damage and/or malfunction of the thrust bearing during such surges.

2. Description of the Prior Art

U.S. Pat. No. 3,895,689 is exemplary of a prior art system for dealing with varying thrust loads in a rotary fluid handling device such as a turbo-expander or compressor. This system employs the technique of using measurements of the lubricant pressure within the thrust bearings as an indication of the thrust loading thereon, and further using such measurements to control a mechanism for selectively venting process fluid from the back or closed end of the rotor. Since process fluid in the latter location can act on the adjacent rotor as if it were a piston, such mechanism basically serves to offset or eliminate the cause of the thrust load surge. However, this mechanism may not relieve the excess thrust loading with sufficient rapidity to fully protect the thrust bearing upon the inception of the thrust surge.

On the other hand, faster acting thrust control mechanisms, such as air actuated instruments, may involve other problems such as hunting or overshooting of the correct thrust control adjustment. Furthermore, if the actuating air for such mechanism should fail, the mechanism may swing to its maximum or minimum correction. Thus, the thrust bearing may still not be adequately protected against damage and/or malfunction.

SUMMARY OF THE INVENTION

The present invention provides a thrust compensation means for a thrust bearing which operates virtually instantaneously upon the inception of an excessive thrust load to protect the bearing. In particular, the system operates on the basic principle of increasing the pressure of lubricant being delivered to an excessively loaded bearing. Since an increase in thrust loading on such a bearing can afford sufficient resistance to the normal lubricant supply pressure to effectively stop fluid flow of the lubricant across the bearing faces, such pressure increase permits lubricant to continue flowing into and through the bearing thereby making the bearing capable of supporting the increased load and preventing overheating, galling or the like.

Accordingly, the invention comprises load sensing means associated with the bearing structure for determining the value of a parameter indicative of the thrust load on a pair of opposed bearing faces. The thrust compensation means of the invention is operably associated with the load sensing means and operative upon sensing by the latter of a thrust load on the bearing faces in excess of a predetermined limit to increase the pressure of lubricant being delivered to the space between those two bearing faces.

The bearing structure may include two pair of opposed bearing faces for carrying thrust loads in respectively opposite axial directions. The load sensing means can then be made operative to sense excessive thrust loads on either of the two pairs of bearing faces, while the thrust compensation means may be made operative to increase the pressure of lubricant being delivered to either bearing in response to the load sensing means. In some embodiments of the invention, the thrust compensation means is designed to increase the pressure of lubricant being delivered only to that bearing which is excessively loaded, while preventing any substantial increase in the pressure of lubricant being delivered to the unloaded bearing. In other embodiments, the thrust compensation means is designed to increase the pressure of lubricant being supplied to both bearings upon the sensation of an excessive thrust load in either of the two bearings.

In preferred forms of the invention, the load sensing means may be a pressure sensing means communicating with the spaces defined between the two pair of opposed bearing faces and operative to determine the lubricant pressure therein. Such means may be operative to determine the lubricant pressure differential between the two bearing spaces. Thus, for example, the parameter determined by the sensing means as indicative of the thrust load on a pair of opposed bearing faces may be the lubricant pressure in the space between such spaces per se or the differential between such lubricant pressure and that in the bearing space between the other pair of bearing faces.

In any event, the load sensing means preferably includes switch means for delivering an activating signal to the thrust compensation means virtually instantaneously upon the detection of a sufficient increase in the thrust load on one of the thrust bearings. Furthermore, the thrust compensation means is designed to produce an extremely rapid lubricant delivery pressure increase in response to such signal.

In some embodiments of the invention, the thrust compensation means includes an auxiliary pump having a higher operating pressure than the primary pump which circulates lubricant during ordinary operation. Other embodiments may employ the same pump or pumps at all times but include first and second pressure relief bypasses each of which is operative to permit fluid flow from the outlet to the inlet of such pumps, bypassing the bearing structure, but having different effective relief pressures. The thrust compensation means may then include a valve or the like for closing the lower pressure bypass.

An especially advantageous application of the system of the present invention is its use in conjunction with a thrust control apparatus such as that disclosed in the aforementioned U.S. Pat. No. 3,895,689. In such a combination, when there is a sudden increase in the thrust load on one of the thrust bearings, the thrust compensation means of the present invention will act immediately, responsive to the load sensing means, to increase the pressure of lubricant being delivered to the loaded bearing to protect such bearing and permit it to carry the increased load during the interim period in which the thrust control apparatus is acting to eliminate the excessive thrust load. However, the present invention may also be used alone or in conjunction with other types of thrust control apparatus.

It is thus a principal object of the present invention to provide an improved thrust bearing system including load sensing means and thrust compensation means responsive thereto to increase the pressure of lubricant being supplied to a loaded bearing.

Another object of the present invention is to provide such a system capable of producing an extremely rapid compensating response to an increase in thrust load.

Still another object of the present invention is to provide such a system operative to increase the pressure of lubricant being delivered to both of two bearings responsive to an increase in the thrust load on either of the two bearings.

A further object of the present invention is to provide such a system operative to increase the pressure of lubricant being delivered to the overloaded bearing while preventing substantial increase of the pressure of the lubricant being delivered to the unloaded bearing.

Still another object of the present invention is to provide such a system wherein the thrust compensation means comprises an auxiliary high pressure pump.

Yet another object of the present invention is to provide such a system wherein the thrust compensation means comprises means for increasing the effective relief pressure for a lubricant circulating pump.

Other objects, features and advantages of the present invention will be made apparent by the following description of preferred embodiments, the drawings and the claims.

DESCRIPTION OF THE PREFERRED EMBODIMENTS

Figure 1:
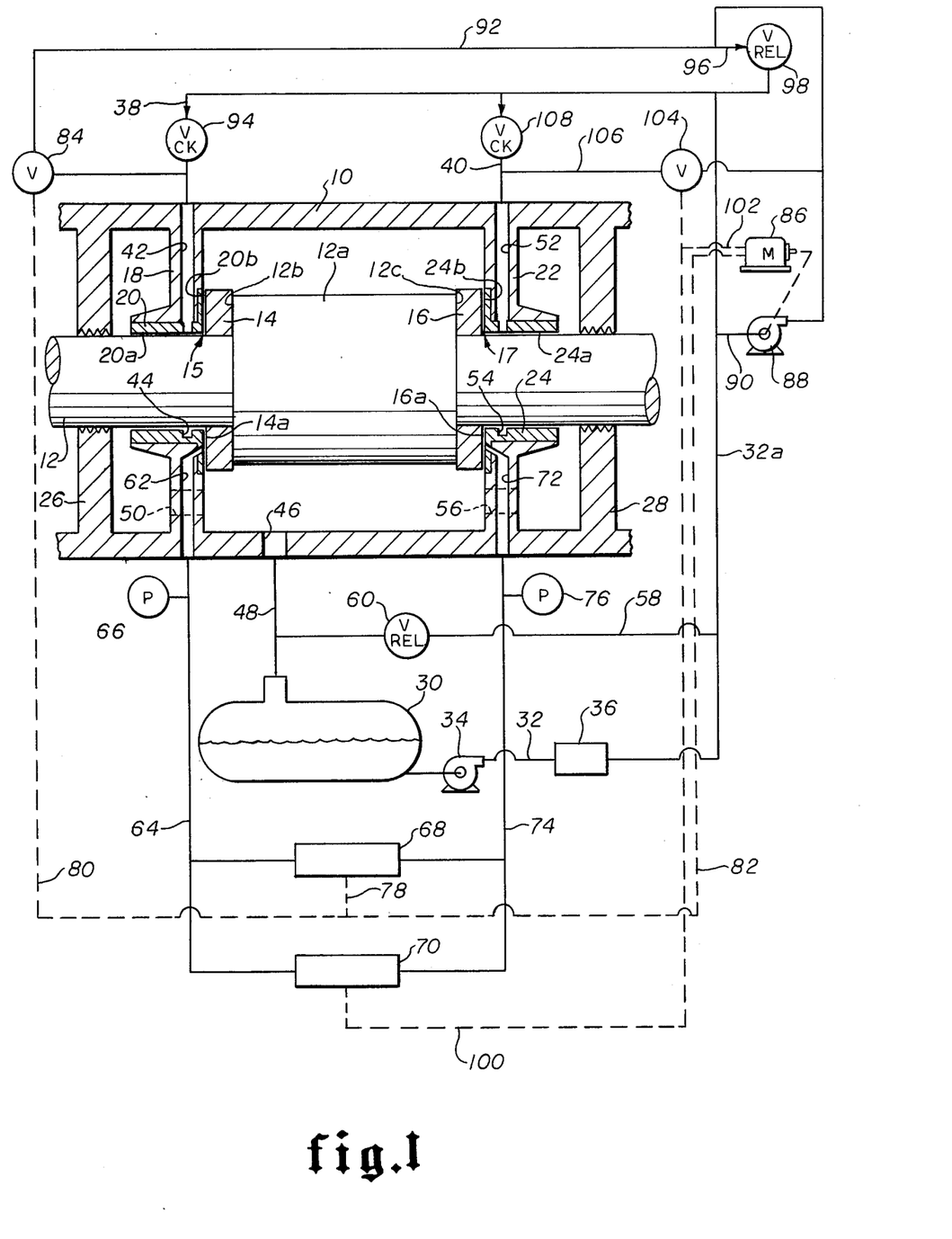
FIG. 1 is a flow diagram of a first embodiment of the present invention.

Referring now to FIG. 1, there is shown a thrust bearing system in accord with a first embodiment of the present invention. The system includes the bearing structure per se, and a sub-system for delivering lubricant to the bearing structure and including the thrust compensation means. The bearing structure is defined by a pair of relatively rotating members, namely a stationary housing 10 and a rotary shaft 12 mounted therein. Shaft 12 carries a rotary device (not shown) which may be, for example, a fluid handling device such as a turbo expander or a compressor. Shaft 12 includes an enlarged diameter portion 12a located within housing 10 and defining annular shoulders 12b and 12c facing outwardly in opposite directions. Annular shoes 14 and 16 are rigidly affixed against respective shoulders 12b and 12c and thus effectively become part of the shaft structure. Shoes 14 and 16 are formed of bearing materials such as a suitable metal, and define respective surfaces 14a and 16a facing axially outwardly in opposite directions.

A first annular fixed bearing member 18 extends radially inwardly from casing 10. An insert 20 of bearing material is rigidly affixed to the radially innermost portion of bearing member 18. Insert 20 thus defines a radially inwardly facing surface 20a which closely surrounds shaft 12 axially outwardly of shoe 14. Surface 20a forms one face of a first radial or rotary bearing, the other face of which is formed by the opposed portion of the outer surface of shaft 12. Insert 20 also defines an axially inwardly facing surface 20b which opposes surface 14a of shoe 14. Thus, surfaces 14a and 20b define the opposed bearing faces of a first thrust bearing of the present bearing structure.

Similarly, a second annular fixed bearing member 22 extends radially inwardly from casing 10 and has an insert 24 of bearing material rigidly affixed to the radially inner portion thereof. Insert 24 defines an annular radially inwardly facing surface 24a which closely surrounds shaft 12 axially outwardly of shoe 16 and forms one of the faces of a second rotary bearing, the other face of which is defined by the opposed portion of shaft 12. Shoe 24 also defines an axially inwardly facing surface 24b which opposes surface 16a of shoe 16, whereby surfaces 16a and 24b define the respective bearing faces of a second thrust bearing.

Annular ridges 26 and 28 extend radially inwardly from casing 10 at positions spaced axially outwardly from respective ones of the bearing members 18 and 22. Each of the ridges 26 and 28 has a labyrinth seal formed on its radially inner surface for sealing the interior of casing 10 with respect to shaft 12.

The lubricant delivery sub-system includes a lubricant reservoir 30 containing oil or like lubricant for the bearing structure. Primary conduit means interconnect reservoir 30 with the bearing structure. Such primary conduit means includes a main line 32 extending away from reservoir 30 and having disposed therein a primary pump 34 for propelling lubricant through the primary conduit means and a filter and cooler 36 located downstream of pump 34. The primary conduit means further includes a pair of branch conduits 38 and 40 extending from the downstream end of conduit 32. Branch 38 communicates with a passageway 42 extending radially through casing 10, bearing member 18, and insert 20. Passageway 42 in turn communicates at its radially inner end with an annular groove 44 in surface 20a. Groove 44 distributes lubricant around the entire circumference of radial bearing face 20a. From groove 44, lubricant flows in both axial directions along face 20a to form a thin film of oil between face 20a and the opposed face of shaft 12 for radial support of the shaft. From the axially inner end of face 20a, the lubricant flows radially outwardly into and through the space 15 defined between the first pair of opposed thrust bearing faces 14a and 20b. Lubricant exiting the first bearing at the axially outer end of face 20a and at the radially outer ends of faces 14a and 20b flows into the bottom of casing 10 and ultimately into a drain 46 whence it is removed via a conduit 48 and returned to reservoir 30. An axial passageway 50 is provided through the lower portion of bearing member 18 to permit lubricant on the axially outer side of bearing member 18 to reach the drain 46.

The second primary conduit branch 40 similarly communicates with a radial passageway 52 through casing 10, bearing member 22, and insert 24. The inner end of passageway 52 in turn communicates with an annular groove 54 in radial bearing face 24a of the second bearing. Oil flows from groove 54 along face 24a in both axial directions to lubricate the second radial bearing and from the axially inner end of face 24a into and through the space 17 defined between the opposed faces 16a and 24b of the second thrust bearing. Oil exiting the second radial-thrust bearing flows into the bottom of casing 10 and back to reservoir 30 via drain 46 and line 48, an axial passageway 56 being provided through the lower portion of bearing member 22 to permit lubricant to pass from the axially outer to the axially inner side of bearing member 22 and thus to drain 46.

A pressure relief bypass including bypass conduit 58 and pressure relief valve 60 is provided for preventing damage to pump 34 in the event of development of an excessive pressure downstream of the pump. One end of conduit 58 communicates with conduit 32 downstream of the pump 34 but upstream of the bearing structure. The other end of conduit 58 communicates with conduit 48. Thus, bypass conduit 58, along with the connected portions of conduits 32 and 48 and reservoir 30 provides a loop permitting communication between the outlet and the inlet of pump 34, bypassing the bearing structure. Valve 60 will open to permit flow from the outlet to the inlet of pump 34, i.e. from right to left in line 58 as shown, only in the presence of a pressure at the pump outlet in excess of a predetermined pressure, which will be referred to herein as the "first release pressure." Thus, an excessive pressure at the outlet of pump 34 will be vented back to the pump inlet to eliminate the danger of damage to pump 34 resulting from such excessive pressure.

During normal operation of the rotary device supported by shaft 12, the normal operation pressure of pump 34, which may be for example about 100 p.s.i., will be sufficient to overcome the resistance to lubricant flow through the space defined between the opposed bearing faces of whichever thrust bearing is loaded. However, with at least some types of rotary devices, transient thrust surges, or sudden sharp increases in the thrust loading, are periodically imposed upon the bearing structure. In the event of such excessive loading, the resistance to flow of lubricant radially outwardly across the opposed thrust bearing faces may become sufficient to overcome the ordinary supply pressure determined by the primary pump 34. If the lubricant flow through the bearing is stopped, the bearing may become overheated and damaged. To prevent such damage, the present invention includes a thrust compensation means operably associated with a load sensing means associated with the bearing structure.

The load sensing means is operative to determine the value of some parameter indicative of the thrust loads on the two pair of opposed thrust bearing faces. In particular, in the preferred embodiments of the invention, the pressure differential between the lubricant in the space 15 between bearing faces 14a and 20b and the lubricant in the space 17 between the bearing faces 16a and 24b is used as the parameter. Accordingly, the load sensing means comprises pressure sensing means including a first tap passageway 62 extending through casing 10, bearing member 18, and insert 20 to space 15. The outer end of tap passageway 62 communicates with a line 64 having branches communicating with a pressure gauge 66 as well as with each of two electric pressure differential switches 68 and 70. Accordingly, the pressure of the lubricant in space 15 will be communicated to gauge 66 and switches 68 and 70. Similarly, a pressure tap passageway 72 is provided through casing 10, bearing member 22, and insert 24 in communication with the space 17. The outer end of tap passageway 72 communicates with line 74 having branches communicating with pressure gauge 76, switch 68, and switch 70.

Switch 68 is, as noted, communicably connected with each of the pressure tap passageways 62 and 72. Switch 68 is sensitive to pressure differentials decreasing from space 15 to space 17 such as would prevail upon the exertion on shaft 12 of a thrust load from right to left, as the system is viewed in FIG. 1. A thrust force in this direction unloads bearing faces 16a and 24b, thereby reducing the pressure of lubricant in space 17 to a minimal value, while loading bearing faces 14a and 20b, the pressure of lubricant in space 15 therebetween being functionally related to the thrust load. When the pressure of lubricant in space 15 exceeds that of the lubricant in space 17 by a value in excess of a predetermined limit, switch 68 will close thereby producing a first electrical signal. This signal is communicated by electrical lines 78, 80 and 82, to an electrically controlled valve 84 and an electric motor 86 which form part of the thrust compensation means of the system.

Motor 86 operates an auxiliary pump 88, also a part of the thrust compensation means. The thrust compensation means further comprises auxiliary conduit means including conduit 90 in which pump 88 is disposed. Conduit 90 has its upstream portion, i.e. that portion communicating with the inlet of pump 88, connected to primary conduit 32 at a point intermediate primary pump 34 and primary branch conduits 38 and 40. The auxiliary conduit means further comprise a first auxiliary branch conduit 92 interconnecting the downstream or outlet end of conduit 90 with the primary branch conduit 38 with leads to lubricant passageway 42 of first bearing member 18. Valve 84 is disposed in auxiliary branch conduit 92 and is a normally closed valve. Pump 88 has a higher operating pressure than pump 34. Thus, upon the emission of the aforementioned signal by switch 68, pump 88 will be activated via motor 86 and will begin pumping lubricant through conduit 90 and branch 92 at a pressure higher than the ordinary lubricant pressure. Simultaneously, valve 84 is opened to permit the flow of such higher pressure lubricant into branch conduit 38 and passageway 42 and, ultimately, into space 15. The resulting increase in the lubricant pressure in space 15 will compensate for the excessive thrust loading on the bearing faces 14a and 20b and will permit the lubricant to continue flowing through the space 15, thereby preventing overheating and damage of the bearing. A check valve 94 is disposed in primary branch conduit 38 upstream of its intersection of auxiliary branch conduit 92. Valve 94 is designed to permit flow through branch conduit 38 toward—but not away from—lubricant passageway 42. Thus, valve 94 prevents the high pressure lubricant in conduit branch 92 from bypassing passageway 42 via branch conduit 38.

In order to prevent damage to pump 88 in the event of the development of an excessive pressure downstream thereof, a pressure relief bypass is provided for pump 88. This bypass includes a conduit 96 communicating with the portion of auxiliary conduit 90 at the downstream or outlet side of pump 88 and containing a pressure relief valve 98. Conduit 96 also communicates with the inlet or upstream portion of auxiliary conduit 90 via an intermediate portion 32a of primary conduit 32. Valve 98 permits venting of the outlet of pump 88 to the inlet thereof upon the pressence at the pump outlet of a pressure in excess of a predetermined release pressure for the auxiliary pump bypass. It will be understood that the absolute pressure required to open valve 98 of the auxiliary pump bypass will be higher than that required to open valve 60 of the primary pump bypass. This means that the differential pressure across relief valve 134 is substantially greater than zero as long as pump 128 is running.

Switch 68 will remain closed, and accordingly motor 86 will continue operation and valve 84 will remain open, as long as the pressure of the lubricant in space 15 exceeds that of the lubricant in space 17 by a value in excess of the aforementioned predetermined limit. When the pressure differential drops below this limit, switch 68 will open so that valve 84 will close and, in the absence of a signal from switch 70, motor 86 will shut off.

Switch 70 is substantially identical to switch 68 except that it is operative to emit a second signal in the presence of a pressure differential decreasing from space 17 to space 15 when such pressure differential exceeds the aforementioned limit. Such a differential will exist in the presence of an excessive thrust load acting on shaft 12 in the direction from left to right as viewed in FIG. 1. When the pressure differential exceeds the critical limit, switch 70 will close thereby producing a second electrical signal. This signal is delivered via lines 100 and 102 to motor 86 and to a normally closed, electrically operated valve 104. Valve 104 is located in auxiliary branch conduit 106 which extends from the downstream portion of conduit 90 to primary branch conduit 40. Thus, upon closing of switch 70, motor 86 will be activated to start up pump 88, which in turn will propel lubricant through conduit 90 and branch 106 at the relatively high operating pressure of pump 88. Such high pressure lubricant then passes through the portion of conduit branch 40 downstream of its point of intersection with branch 106, through passageway 52, and ultimately into and through space 17. This compensates for the excessive thrust load on bearing faces 16a and 24b.

It will be noted that only one of the two pairs of opposed thrust bearing faces can be loaded at any given time. Accordingly, only one of the two switches 68 and 70 can be closed at any given time. Thus, for example, when switch 70 is closed, so that high pressure lubricant is being delivered to space 17, switch 68 will be open so that valve 84 remains closed. Conversely, when valve 84 is open, responsive to a signal from switch 68, valve 104 will be closed since switch 70 will be emitting no signal. Thus, the system not only provides high pressure lubricant to the excessively loaded bearing, but also actively prevents any substantial increase in the pressure of lubricant being supplied to the unloaded bearing.

A check valve 108 is positioned in primary branch conduit 40 upstream of the point of intersection of auxiliary branch conduit 106 therewith. Valve 108 prevents fluid flow away from passageway 52, thereby preventing high pressure lubricant from branch 106 from bypassing the bearing structure via the primary conduit means of the normal lubricant delivery system.

It is also noted that electric differential switches such as 68 and 70 are well known and commercially available. Thus the structural details of such switches are not described herein.

Figure 2:
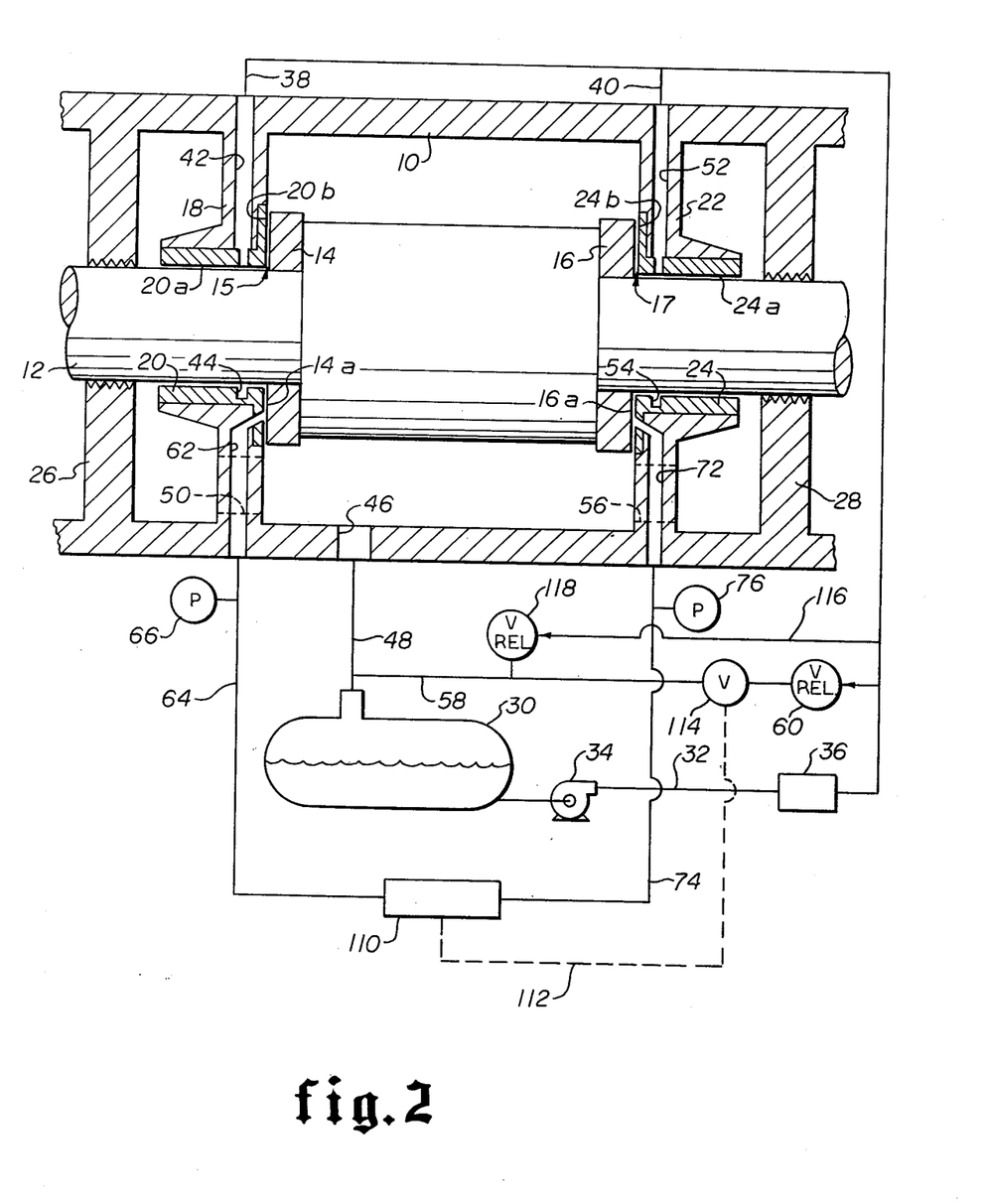
FIG. 2 is a flow diagram of a second embodiment of the present invention.

Referring now to FIG. 2, there is shown a second embodiment of the invention. The system shown therein includes a bearing structure and an ordinary or primary lubricant delivery sub-system substantially identical to those of the embodiment of FIG. 1. Accordingly, like parts of these sub-systems have been given the same reference numerals in FIG. 2 as in FIG. 1. Briefly, the bearing structure includes stationary casing 10 and rotary shaft 12, portions of which define two combination radial and thrust bearings. The first thrust bearing includes opposed faces 14a and 20b, defining space 15 therebetween, while the second thrust bearing includes opposed faces 16a and 24b defining space 17 therebetween.

Lubricant from a reservoir 30 is propelled by pump 34 through primary conduit 32 and primary branch conduits 38 and 40 into respective passageways 42 and 52 communicating with the radial portions of respective ones of the bearings, and thus ultimately with spaces 15 and 17 respectively. Lubricant exiting the two bearings is returned to reservoir 30 via drain 46 and conduit 48.

A bypass conduit 58 interconnects a portion of conduit 32 downstream of pump 34 (and thus adjacent the pump outlet) with a portion of conduit 48 upstream of reservoir 30 (and thus communicating with the pump inlet via reservoir 30). Thus, conduit 58 together with the adjacent portions of conduits 32 and 48 and reservoir 30 form a bypass loop interconnecting the pump outlet and inlet. As in the embodiment of FIG. 1, a pressure relief valve 60 is disposed in conduit 58 and is operative to open in response to lubricant pressure at the pump outlet in excess of a predetermined release value. Thus, upon the presence of an excessive pressure downstream of pump 34, lubricant will be permitted to vent from the pump outlet to the pump inlet bypassing the bearing structure and thereby preventing overloading of pump 34.

As in the embodiment of FIG. 1, the load sensing means is in the form of pressure sensing means including tap passageways 62 and 72 communicating with bearing spaces 15 and 17, respectively. Tap passageway 62 communicates with line 64, which is connected to pressure gauge 66; while tap passageway 72 communicates with line 74, connected to pressure gauge 76. However, rather than the two pressure differential switches of the embodiment of FIG. 1, the instant embodiment includes only a single pressure differential switch 110 communicatively connected to each of the lines 64 and 74. Switch 110 is sensitive to lubricant pressure differentials in either direction, i.e. differentials decreasing from space 15 to space 17 as well as differentials decreasing from space 17 to space 15. Upon the presence of a pressure differential in excess of a predetermined limit, switch 110 will close, thereby transmitting a signal through electrical line 112.

The thrust compensation means of the embodiment of FIG. 2 includes a normally open electrically operated valve 114 disposed in bypass conduit 58 downstream of pressure relief valve 60, i.e. intermediate valve 60 and conduit 48. The thrust compensation means further includes a second bypass conduit 116 containing a second pressure relief valve 118 and having one end connected to conduit 32 at the downstream or outlet side of pump 34, and also downstream of first bypass conduit 58. The other end of conduit 116 is connected to conduit 58 downstream of valve 114, i.e. intermediate the valve 114 and conduit 48. Valve 118 is operative in the presence of lubricant pressure in the attached portion of conduit 32, i.e. adjacent the pump outlet, to permit lubricant flow from that portion of conduit 32 to the downstream portion of conduit 58. Thus, conduit 116 and valve 118, together with the connected conduits and reservoir 30, provide a second bypass which permits lubricant to flow from the outlet to the inlet of pump 34, bypassing the bearing structure as well as the valves 60 and 114 in the first bypass.

In operation, as long as the pressure differential between spaces 15 and 17 remains below the predetermined limit of switch 110, valve 114 will remain open. Accordingly, the first bypass, including valve 60, will remain operative. However, if the lubricant pressure in either of the spaces 15 and 17 exceeds the lubricant pressure in the other space by a value in excess of the predetermined limit, switch 110 will close to deliver an activating signal to valve 114 via line 112, whereby valve 114 will close. This closes the first bypass leaving only the second bypass, including conduit 116 and valve 118, in effect. The release value of valve 118 is significantly higher than that of valve 60; thus the closing of the first bypass via valve 114 will enable pump 34 to continue delivering the lubricant to spaces 15 and 17 in the presence of a pressure within one of these spaces which would otherwise be great enough to open valve 60 and cause the lubricant to bypass the bearing structure. Thus, there is an increase in the pressure of the lubricant being delivered to the loaded bearing space 15 or 17 in response to the increased pressure therein. The release value of valve 118, and thus the pressure at which pump 34 can continue to deliver lubricant to the bearing spaces, is high enough to overcome the resistance offered by the transient thrust surges which are anticipated for the given rotary device. However, the release value of valve 118, although significantly higher than that of valve 60, is low enough to prevent damage to pump 34 which might be caused by extremely high loading of the bearing or other factors contributing to pressure at the pump outlet in excess of the release value of valve 118.

As mentioned above, the system of FIG. 2 employs only one pressure differential switch 110 within the pressure sensing sub-system. This switch produces the same signal regardless of which of the two bearing spaces 15 or 17 has the excess lubricant pressure, and no valves or other means are provided for blocking the higher pressure lubricant resulting from operation of the thrust compensation sub-system from the unloaded bearing space. Thus, the pressure of lubricant being delivered to both bearing spaces will be increased in the presence of an excessive thrust load on either bearing. When the lubricant pressure differential between bearing spaces 15 and 17 drops below the limit of switch 110, the latter will open cutting off the activating signal through 112. Valve 114 will then automatically open, and normal operation will resume.

Figure 3:
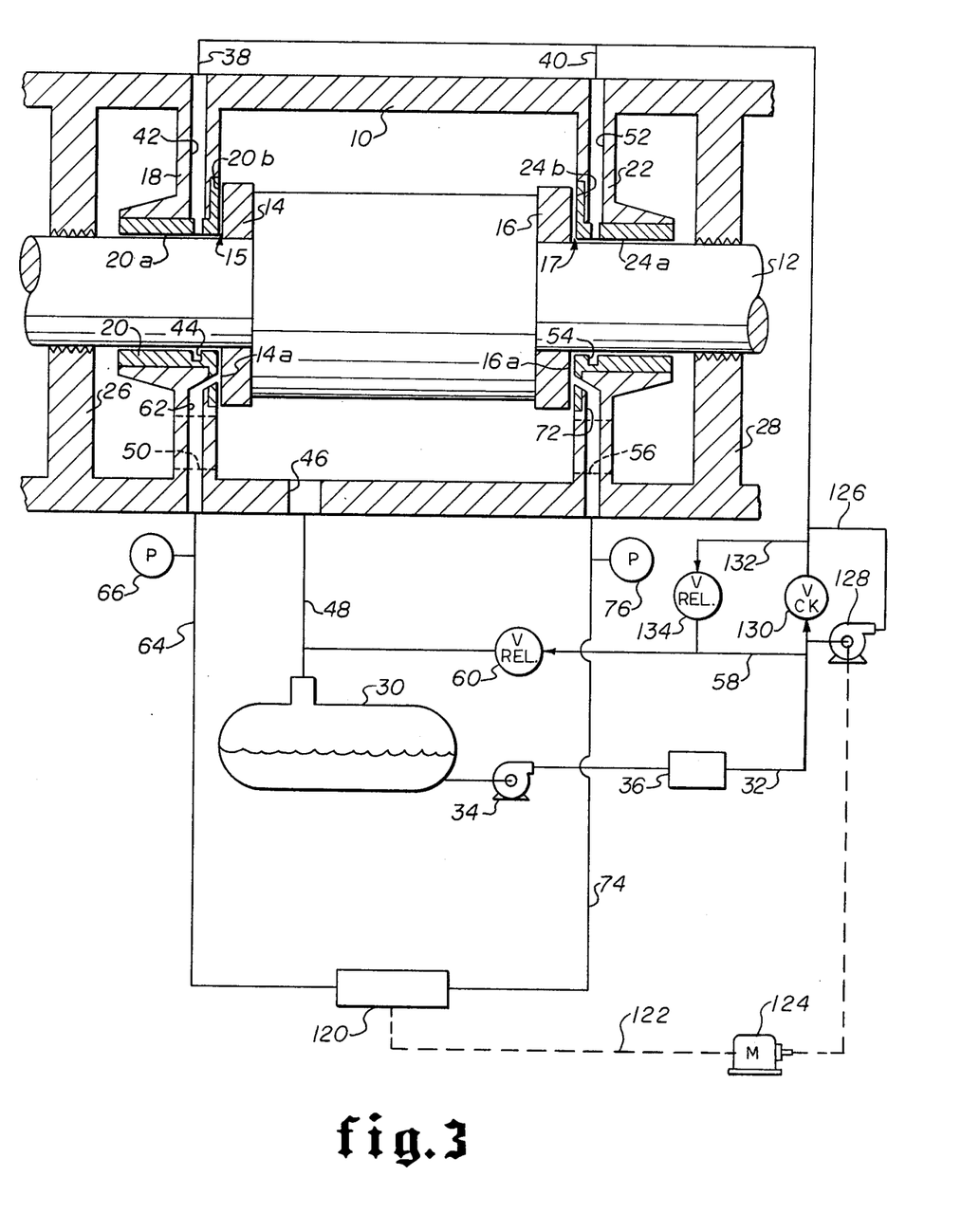
FIG. 3 is a flow diagram of a third embodiment of the present invention.

Referring now to FIG. 3, there is shown a third embodiment of the present invention. Parts of the system of FIG. 3 which are common to the preceeding systems have been given the same reference numerals as in FIGS. 1 and 2. In particular, the system of FIG. 3 includes a bearing structure and a normal lubricant delivery sub-system substantially identical to those of the preceeding embodiments. The system of FIG. 3 is similar to that of FIG. 2 in that the pressure sensing means includes only a single switch, sensitive to pressure differentials decreasing in either direction, and that its thrust compensation means is operative upon the emission of a signal by such switch to increase the pressure of lubricant being delivered to both of the two bearing spaces 15 and 17. On the other hand, the system of FIG. 3 is similar to that of FIG. 1 in that it includes an auxiliary high pressure pump for the thrust compensation sub-system.

As in the preceeding embodiments, normal operation of the system includes pumping of lubricant from reservoir 30 and primary branch conduits 38 and 40 to passageways 42 and 52 respectively. From the passageways 38 and 40 the lubricant flows through the two radial bearings into and through the associated thrust bearing spaces 15 and 17. A bypass including conduit 58 containing a pressure relief valve 60, and substantially identical to the like numbered parts of the system of FIG. 1, provides for venting of the outlet side of pump 34 to the inlet side thereof in the presence of pressure adjacent the pump outlet in excess of the release value of valve 60.

The pressure sensing means includes a pair of pressure tap passageways 62 and 72 communicating with bearing spaces 15 and 17 respectively. Passageway 62 communicates with line 64, which is connected to pressure gauge 66 and also to pressure differential switch 120. Likewise, passageway 72 communicates with line 74 connected to gauge 76 and switch 120. If the lubricant pressure in either of the bearing spaces 15 or 17 exceeds that of the other bearing space by a value in excess of a predetermined limit, switch 120 will close and deliver a signal via line 122 to electric motor 124 of the thrust compensation means of the system. The thrust compensation means further includes an auxiliary conduit 126 having its two ends communicatively connected to primary conduit 32 at spaced locations and containing an auxiliary pump 128 operated by motor 124. Pump 128 operates at a higher pressure than pump 34. Thus, upon the emission of a signal by switch 120, pump 128 will be activated via motor 124 to begin pumping lubricant at an increased pressure through auxiliary conduit 126 and the portion of primary conduit 32 downstream thereof, and ultimately into the bearing spaces 15 and 17. When the lubricant pressure differential between bearing spaces 15 and 17 drops below the limit of switch 120, it will open, de-activating motor 124 and pump 128.

A check valve 130 is disposed in conduit 32 intermediate the ends of conduit 126. Check valve 130 permits lubricant to flow through line 32 from pump 34 past auxiliary conduit 126 and toward the bearing structure during normal operation, but prevents lubricant from pump 128 from bypassing the bearing structure via the primary conduit means when the thrust compensation means is in operation. However, in order to prevent damage to pump 128 in the presence of an extremely high pressure adjacent the outlet thereof, a bypass conduit 132 is provided connecting a portion of conduit 32 downstream of valve 130 with the conduit 58, which intersects conduit 32 upstream of valve 130. Conduit 132 contains a pressure relief valve 134 which will operate to permit venting of lubricant from the outlet side of pump 128 to the inlet side thereof via conduit 132 and the connected portions of conduits 32, 58 and 126, in the presence of a pressure adjacent the outlet of pump 128 in excess of a predetermined release value. The latter release value is higher than the release value for valve 60. This means that the differential pressure across relief valve 134 is substantially greater than zero as long as pump 128 is running.

It can thus be seen that each of the preceeding embodiments of the present invention provides a bearing system including thrust compensation means for increasing the pressure of lubricant being delivered to at least the loaded one of two thrust bearings upon the inception of a thrust surge. In each case, the activation of the thrust compensation means is effected by a signal emitted virtually instantaneously upon the inception of the thrust surge, as evidenced by a sufficient increase in the pressure of lubricant in the loaded thrust bearing. Thus, the system of the present invention can be advantageously combined with a thurst control system, such as that shown in U.S. Pat. No. 3,895,689. In such combination, the present thrust compensation means may provide a fast but temporary means for protecting the overloaded bearing while the thrust control system is operating to gradually relieve the excessive thrust load. However, in certain applications, systems according to the present invention may be used alone as the sole means for dealing with thrust surges.

The three exemplary embodiments disclosed above also demonstrate the manner in which the basic concept of the invention can be adapted for various applications and/or to enhance one or another of the various features of the invention. For example, the system of FIG. 1, while relatively elaborate, provides a relatively sophisticated system in which the primary pump means is fully protected and in which the high pressure lubricant is delivered by the thrust compensation means only to the overloaded bearing. The system of FIG. 2, on the other hand, represents one of the simplest forms of the invention, and therefore a relatively inexpensive version. FIG. 3 represents a system which combines features of the systems of FIGS. 1 and 2 and is intermediate those two systems in its degree of complexity.

Still other modifications of the exemplary systems described above can be made within the spirit of the invention. For example, while electrical differential switches have been shown, various other devices also known in the art, such as fluidic switches, sonic devices, etc., may be used in practicing the present invention. Likewise, while the lubricant pressure within the thrust bearing spaces provides an especially convenient parameter for detecting excessive thrust loading, other parameters can also be used. Also, a series of pumps can be used in place of each of the individual pumps illustrated in the figures. Accordingly, it is intended that the scope of the invention be limited only by the claims which follow.

We claim:

1. A thrust bearing system comprising:
a thrust bearing structure including at least a first pair of opposed bearing faces defining a first bearing space therebetween;
means for delivering lubricant to said first bearing space;
thrust compensation means operative upon delivery thereto of an activating signal to increase the pressure with which the lubricant is delivered to said first bearing space;
and load sensing means including switch means associated with said bearing structure for determining the value of a parameter indicative of the thrust load on said first pair of bearing faces and operatively associated with said thrust compensation means to deliver said activating signal to said thrust compensation means substantially instantaneously when said parameter exceeds a predetermined limit.

2. A thrust bearing system according to claim 1 wherein said bearing structure further includes a second pair of opposed bearing faces defining a second bearing space therebetween, said bearing structure comprising first and second relatively rotatable members, each of said members having two oppositely axially facing surfaces, and each of said two surfaces of each of said members defining one of the bearing faces of a respective one of said pairs.

3. A thrust bearing system according to claim 2 wherein said load sensing means is further operative to determine the value of a parameter indicative of the thrust load on said second pair of bearing faces and wherein said thrust compensation means is further operative upon sensing by said load sensing means of a thrust load on said second pair of bearing faces in excess of said limit to increase the pressure of lubricant being delivered to said second bearing space.

4. A thrust bearing system according to claim 3 wherein said load sensing means comprising pressure sensing means communicating with said bearing spaces to determine lubricant pressures within said bearing spaces.

5. A thrust bearing system according to claim 4 wherein said pressure sensing means comprises means for sensing lubricant pressure differentials between said bearing spaces.

6. A thrust bearing system according to claim 3 wherein said thrust compensation means is operative upon sensing by said load sensing means of a thrust load in excess of said limit on either of said pairs of bearing faces to increase the pressure of lubricant being delivered to both of said bearing spaces.

7. A thrust bearing system according to claim 3 wherein said switch means is a differential switch means operative to sense thrust load differentials between said two pairs of bearing faces and to deliver said activating signal to said thrust compensation means when the thrust load on one of said pairs of bearing faces exceeds the lubricant pressure on the other of said pairs of bearing faces by a value in excess of said limit.

8. A thrust bearing system according to claim 7 wherein said switch means is operative to deliver said activating signal when the thrust load on either of said pairs of bearing faces exceeds the thrust load on the other of said pairs of bearing faces by a value in excess of said limit, and wherein said thrust compensation means is operative upon receipt of said signal to increase the pressure of lubricant being delivered to both of said bearing spaces.

9. A thrust bearing system comprising:
a thrust bearing structure including at least a first pair of opposed bearing faces defining a first bearing space therebetween;
means for delivering lubricant to said first bearing space including primary conduit means communicating with said first bearing space and primary pump means connected to said primary conduit means for propelling lubricant through said primary conduit means and pressure relief means for venting the outlet of said primary pump means, said pressure relief means including first bypass means disposed between the inlet and the outlet of said primary pump means and operative to permit lubricant flow from said outlet to said inlet bypassing said first bearing space upon the presence of pressure at said outlet greater than a predetermined first release pressure;

load sensing means associated with said bearing structure for determining the value of a parameter indicative of the thrust load on said first pair of bearing faces;

and thrust compensation means including valve means operably associated with said load sensing means and operative upon sensing by said load sensing means of a thrust load on said first pair of bearing faces in excess of a predetermined limit to close said first bypass means and thereby increase the pressure with which the lubricant is delivered to said first bearing space.

10. A thrust bearing system according to claim 9 wherein said thrust compensation means includes second bypass means disposed between the inlet and the outlet of said primary pump means and operative to permit lubricant flow from said outlet to said inlet bypassing said first bearing space upon the presence of pressure at said outlet greater than a predetermined second release pressure greater than said first release pressure.

* * * * *